(12) United States Patent
Kinoshita et al.

(10) Patent No.: US 12,439,536 B2
(45) Date of Patent: Oct. 7, 2025

(54) ELECTRONIC APPARATUS AND METHOD FOR MANUFACTURING ELECTRONIC APPARATUS

(71) Applicant: Lenovo (Singapore) Pte. Ltd., Singapore (SG)

(72) Inventors: Hiroaki Kinoshita, Kanagawa (JP); Takayuki Morino, Kanagawa (JP); Takehito Yamauchi, Kanagawa (JP); Daisuke Takahashi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 18/492,267

(22) Filed: Oct. 23, 2023

(65) Prior Publication Data

US 2024/0215183 A1    Jun. 27, 2024

(30) Foreign Application Priority Data

Dec. 22, 2022 (JP) ................. 2022-206047

(51) Int. Cl.
| | |
|---|---|
| *G06F 1/16* | (2006.01) |
| *H05K 5/00* | (2025.01) |
| *H05K 5/02* | (2006.01) |
| *H05K 7/00* | (2006.01) |

(52) U.S. Cl.
CPC ......... *H05K 5/0226* (2013.01); *G06F 1/1618* (2013.01)

(58) Field of Classification Search
CPC .. H05K 5/0226; H05K 5/0217; H05K 5/0221; H05K 5/023; H05K 5/0234; H05K 5/0243; H05K 5/0247; G06F 1/1618; G06F 1/1616; G06F 1/1652
See application file for complete search history.

(56) References Cited

U.S. PATENT DOCUMENTS

| | | | |
|---|---|---|---|
| 10,890,951 B1* | 1/2021 | Watamura | G06F 1/1681 |
| 10,905,020 B2* | 1/2021 | Jan | F16H 21/44 |
| 10,921,864 B2* | 2/2021 | Choi | G06F 1/1652 |
| 11,615,722 B2* | 3/2023 | Morino | G06F 1/1616 345/173 |
| 12,277,004 B2* | 4/2025 | Shim | G06F 1/1647 |
| 12,306,673 B2* | 5/2025 | Kinoshita | G06F 1/1656 |

(Continued)

FOREIGN PATENT DOCUMENTS

JP    6971354 B2    11/2021

*Primary Examiner* — Anthony M Haughton
(74) *Attorney, Agent, or Firm* — Osha Bergman Watanabe & Burton LLP

(57) ABSTRACT

An electronic apparatus includes a first chassis member, a second chassis member, first plate supported by the first chassis member, second plate supported by the second chassis member and aligned with a gap between the first plate and the second plate, display formed in a sheet shape having flexibility, first fastening portion that fixes the first plate to the first chassis member, and second fastening portion that fixes the second plate to the second chassis member. The first plate has a protruding portion that protrudes from a rear surface, and the first chassis member has a wall portion that faces the protruding portion. A stopper member is interposed between the protruding portion and the wall portion and restricts relative movement of the first plate with respect to the first chassis member in an alignment direction of the first plate and the second plate.

8 Claims, 10 Drawing Sheets

(56) References Cited

U.S. PATENT DOCUMENTS

| | | | | |
|---|---|---|---|---|
| 2010/0265426 A1* | 10/2010 | Jeon | ................ | G02F 1/133308 |
| | | | | 349/58 |
| 2012/0149438 A1* | 6/2012 | Kwon | .................. | H04M 1/022 |
| | | | | 16/248 |
| 2013/0010497 A1* | 1/2013 | Lee | ..................... | G02B 6/0081 |
| | | | | 362/611 |
| 2015/0241925 A1* | 8/2015 | Seo | ...................... | G06F 1/1652 |
| | | | | 361/679.27 |
| 2015/0296640 A1* | 10/2015 | Jung | ....................... | H04N 5/64 |
| | | | | 312/7.2 |
| 2016/0085265 A1* | 3/2016 | Park | ................... | H04M 1/0268 |
| | | | | 361/807 |
| 2020/0275563 A1* | 8/2020 | Watamura | ............... | H05K 7/18 |

\* cited by examiner

ELECTRONIC APPARATUS AND METHOD FOR MANUFACTURING ELECTRONIC APPARATUS

CROSS-REFERENCE TO RELATED APPLICATIONS

This application claims priority to Japanese Patent Application No. 2022-206047 filed on Dec. 22, 2022, the contents of which are hereby incorporated herein by reference in their entirety.

BACKGROUND

Technical Field

The present invention relates to an electronic apparatus in which a plurality of chassis members is relatively rotatably connected, and a method for manufacturing the electronic apparatus.

Description of Related Art

The present applicant proposes an electronic apparatus configured such that not only a chassis but also a display is capable of being bent by using a flexible display such as organic electro luminescence (EL) (see Japanese Patent Publication No. 6971354).

A flexible display has a bending region at a position straddling left and right chassis members. The bending region needs to be in a free state without being fixed to other members. For this reason, the bending region of the display produces protruding wrinkles and waves when opened into a flat plate shape, thereby deteriorating visibility and appearance quality. Therefore, Japanese Patent Publication No. 6971354 proposes a method capable of applying tension to the bending region when plates are returned to the flat plate shape, by disposing the two plates whose adjacent edge portions come into contact with each other in a substantially V shape to fix the display.

However, although tension is applied to the display at the time of manufacture to prevent occurrence of wrinkles or the like, it has been found that the display may produce wrinkles or the like again in a case where a plate that supports the display is displaced with respect to a chassis member, for example, when an electronic apparatus receives an impact or the like.

SUMMARY

The present invention has been made in consideration of the above problems of the related art, and an object of the present invention is to provide an electronic apparatus capable of suppressing occurrence of wrinkles in a display having a bendable region, and a method for manufacturing the electronic apparatus.

An electronic apparatus according to a first aspect of the present invention includes a first chassis member, a second chassis member that is adjacent to the first chassis member and relatively rotatably connected to the first chassis member, a first plate that is supported by the first chassis member, a second plate that is supported by the second chassis member and aligned with a gap between the first plate and the second plate, a display that is formed in a sheet shape having flexibility, and has a first region fixed to a front surface of the first plate, a second region fixed to a front surface of the second plate, and a bending region capable of being bent and provided to straddle the gap between the first region and the second region, a first fastening portion that fixes the first plate to the first chassis member, and a second fastening portion that fixes the second plate to the second chassis member, in which the first plate has a protruding portion that protrudes from a rear surface, the first chassis member has a wall portion that faces the protruding portion, and a stopper member that is interposed between the protruding portion and the wall portion and restricts relative movement of the first plate with respect to the first chassis member in an alignment direction of the first plate and the second plate is further included.

A method for manufacturing an electronic apparatus according to a second aspect of the present invention is a method for manufacturing an electronic apparatus including a first chassis member and a second chassis member that are relatively rotatably connected to each other, including a first step of fixing a first region of a display formed in a sheet shape having flexibility to a front surface of a first plate, fixing a second region to a front surface of a second plate aligned with a gap between the first plate and the second plate, and causing a state in which a bending region capable of being bent straddles the gap, a second step of fixing the second plate to the second chassis member after the first step, a third step of fixing the first plate to the first chassis member while pulling the first plate toward a separation direction separating from the second plate after the second step, and a fourth step of interposing a stopper member between a protruding portion that protrudes from a rear surface of the first plate and a wall portion that is provided in the first chassis member and faces the protruding portion and restricting relative movement of the first plate with respect to the first chassis member in an alignment direction of the first plate and the second plate after the third step.

The above-described aspects of the present invention can suppress occurrence of wrinkles in a display having a bendable region.

DETAILED DESCRIPTION

An electronic apparatus and a method for manufacturing the same according to the present invention will be described in detail below with preferred embodiments with reference to the accompanying drawings.

Figure 1:
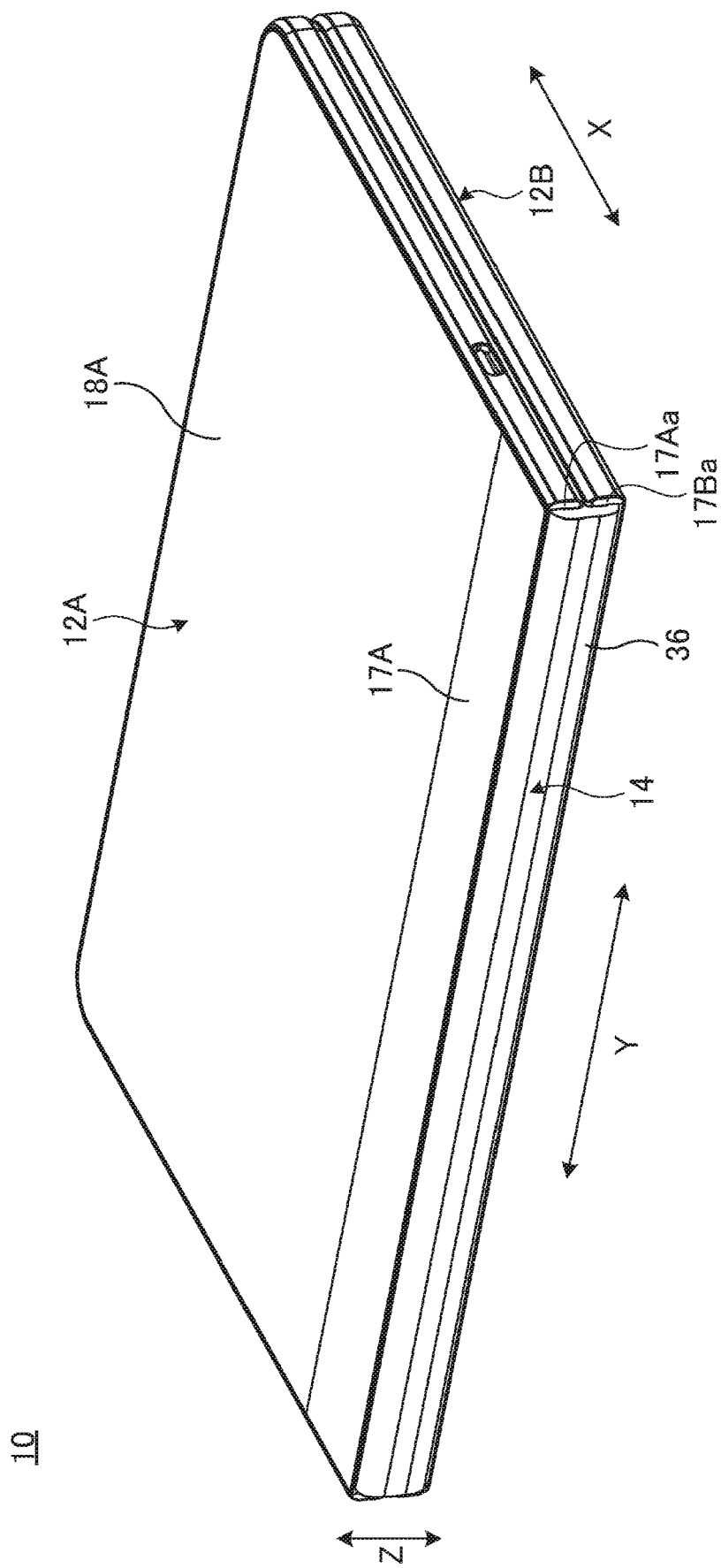
FIG. 1 is a perspective view schematically illustrating a state in which an electronic apparatus according to an embodiment is closed and in a 0-degree posture.
Figure 2:
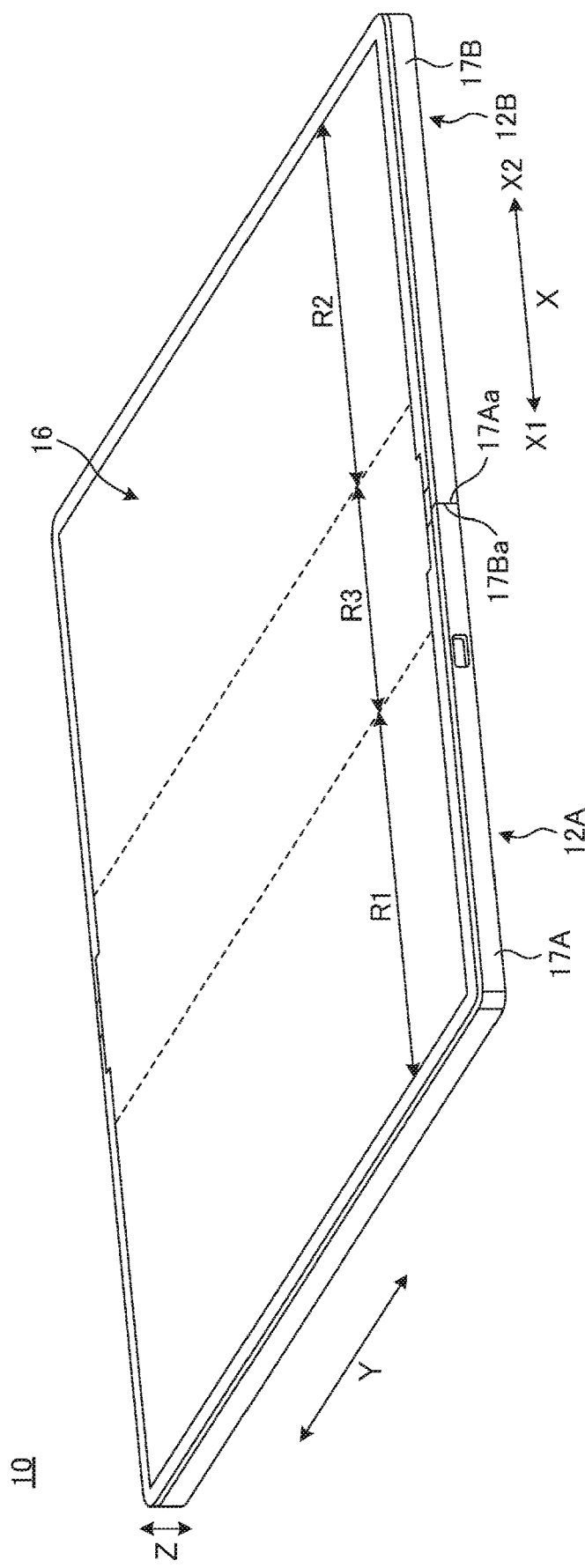
FIG. 2 is a perspective view schematically illustrating a state in which the electronic apparatus illustrated in FIG. 1 is opened and in a 180-degree posture.
Figure 3:
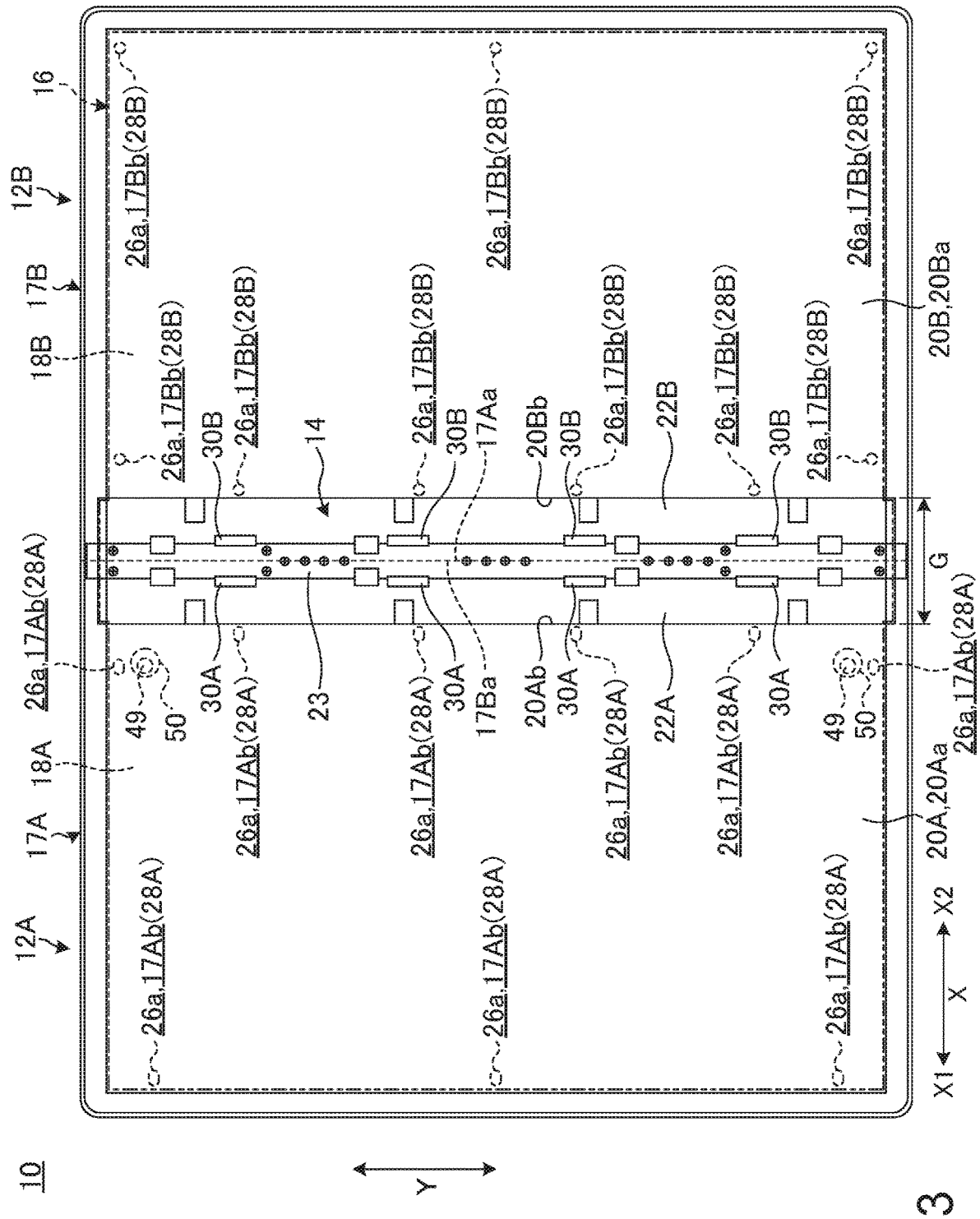
FIG. 3 is a plan view schematically illustrating an internal structure of the electronic apparatus illustrated in FIG. 2.

FIG. 1 is a perspective view schematically illustrating a state in which an electronic apparatus 10 according to an embodiment is closed and in a 0-degree posture. FIG. 2 is a perspective view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2.

As illustrated in FIGS. 1 to 3, the electronic apparatus 10 includes a first chassis 12A, a second chassis 12B, a hinge device 14, and a display 16. The electronic apparatus 10 of the present embodiment exemplifies a tablet PC or a laptop PC that is capable of being folded like a book. The electronic apparatus 10 may be a smartphone, a portable game machine, or the like.

Each of the chassis 12A and 12B is disposed adjacent to each other. The first chassis 12A includes a first chassis member 17A and a first cover member 18A. The first chassis member 17A is a rectangular frame-shaped member having standing walls formed on three sides other than an edge portion 17Aa adjacent to the second chassis 12B. The first cover member 18A is a plate-shaped member that closes the rear opening of the first chassis member 17A (see also FIG. 5). Similarly, the second chassis 12B includes a second chassis member 17B that has standing walls formed on three sides other than an edge portion 17Ba adjacent to the first chassis 12A, and a second cover member 18B that closes a rear opening of the second chassis member 17B. The front openings of the chassis members 17A and 17B are closed with the display 16.

Each of the members 17A, 17B, 18A, and 18B is made of, for example, a metal member such as stainless steel, magnesium, or aluminum, or a fiber-reinforced resin plate containing reinforcing fibers such as carbon fiber.

The hinge device 14 relatively rotatably connects the chassis 12A and 12B. The hinge device 14 also functions as a rear cover that hides the gap between the edge portions 17Aa and 17Ba formed in the 0-degree posture illustrated in FIG. 1 (see FIG. 6). The display 16 extends over the chassis 12A and 12B.

Hereinafter, the electronic apparatus 10 will be described while the alignment direction of the chassis 12A and 12B is called an X direction, the direction along the edge portions 17Aa and 17Ba orthogonal to the X direction is called a Y direction, and the thickness direction of the chassis 12A and 12B is called a Z direction. As for the X direction, the direction from the second chassis 12B to the first chassis 12A may be called an X1 direction, and a direction opposite to the X1 direction may be called an X2 direction. Further, the angular posture between the chassis 12A and 12B will be described while a state in which the chassis 12A and 12B are stacked to overlap each other in the surface normal direction is called the 0-degree posture (see FIG. 1), and a state in which the chassis 12A and 12B are aligned in a direction perpendicular to the surface normal direction (X direction) is called the 180-degree posture (see FIG. 2). It is possible to call the posture between 0 and 180 degrees by appropriately carving the angle, and for example, a state in which the surface normal directions of the chassis 12A and 12B are orthogonal to each other is a 90-degree posture. These angles are for convenience of description, and the actual product may of course have angular positions slightly deviated from the exact angular positions indicated by angle numbers.

Figure 4:
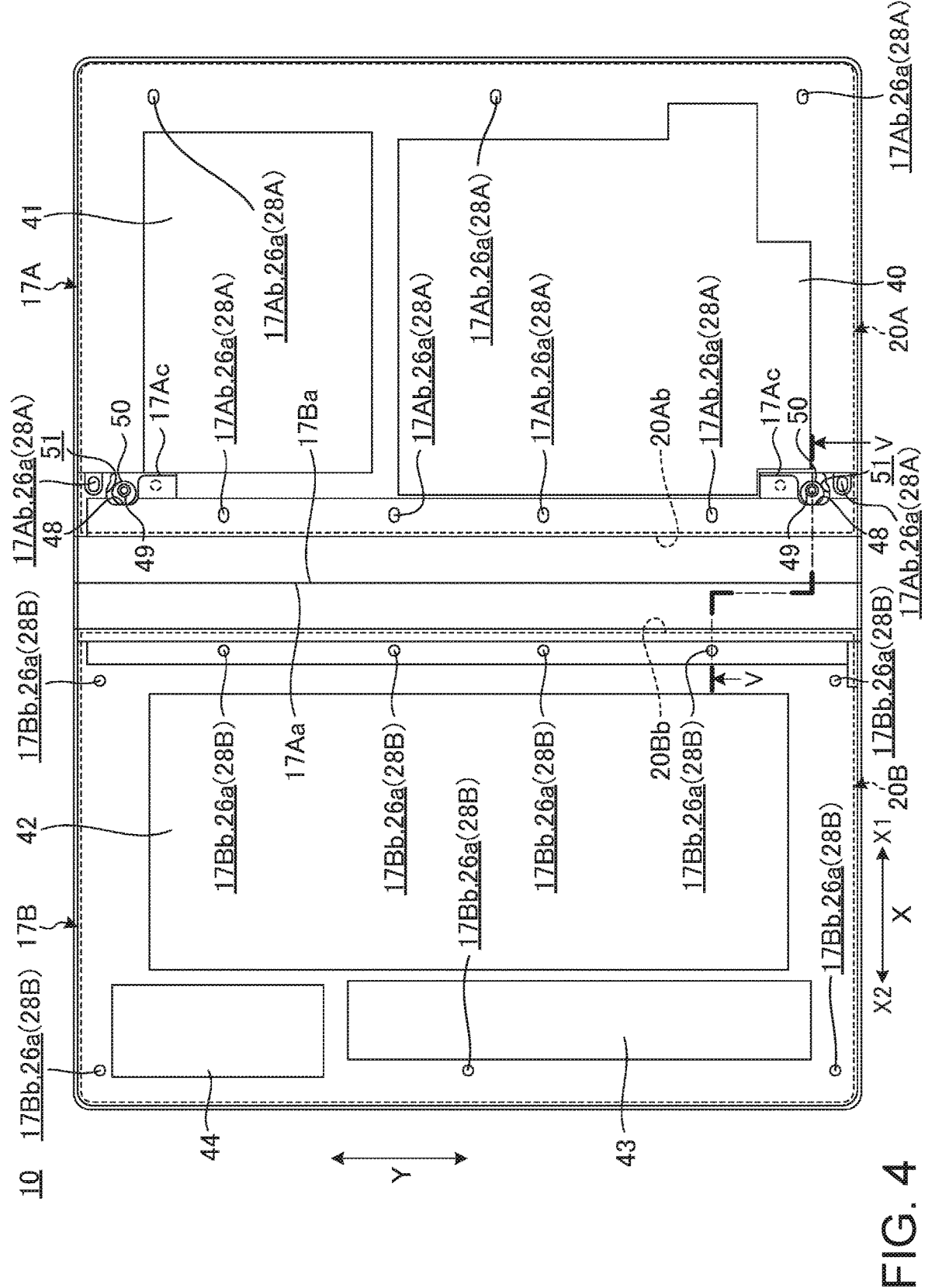
FIG. 4 is a bottom view schematically illustrating the internal structure of the electronic apparatus illustrated in FIG. 3.
Figure 5:
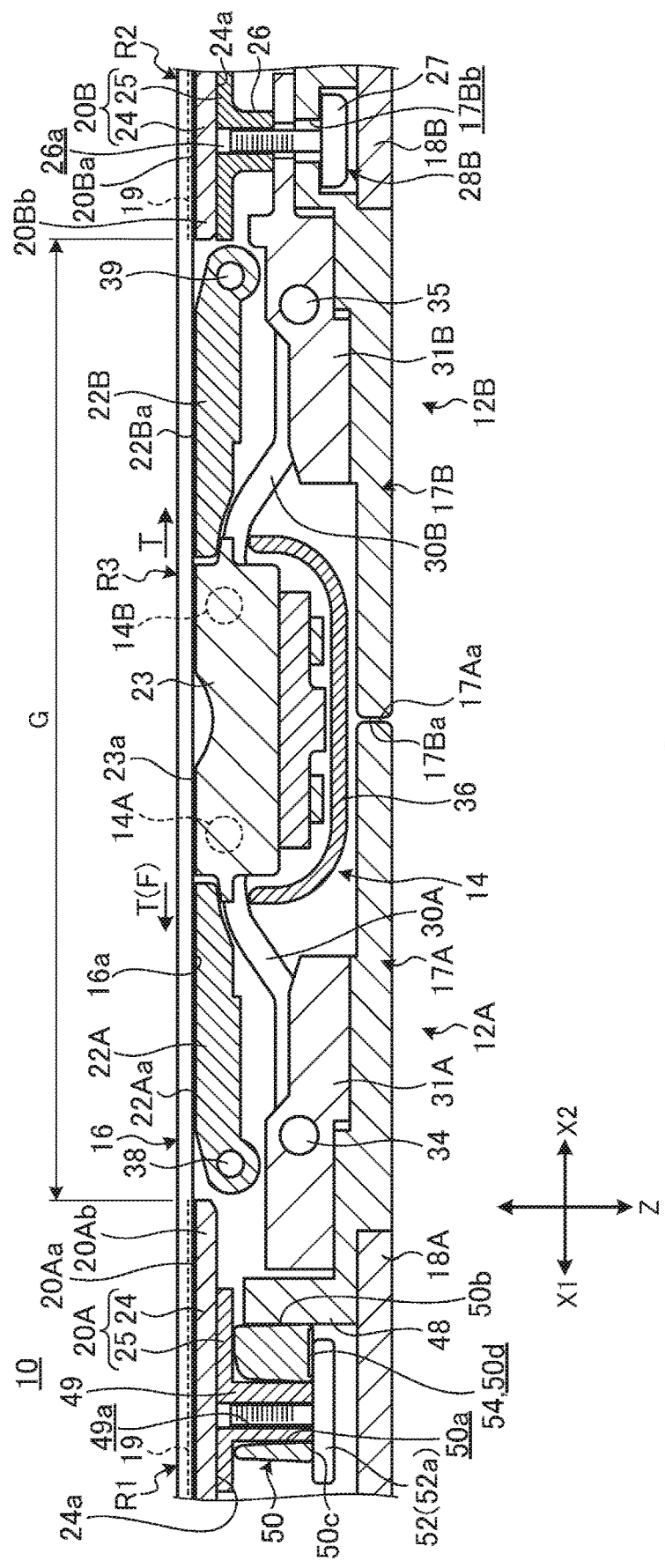
FIG. 5 is a schematic cross-sectional view taken along line V-V in FIG. 4.
Figure 6:
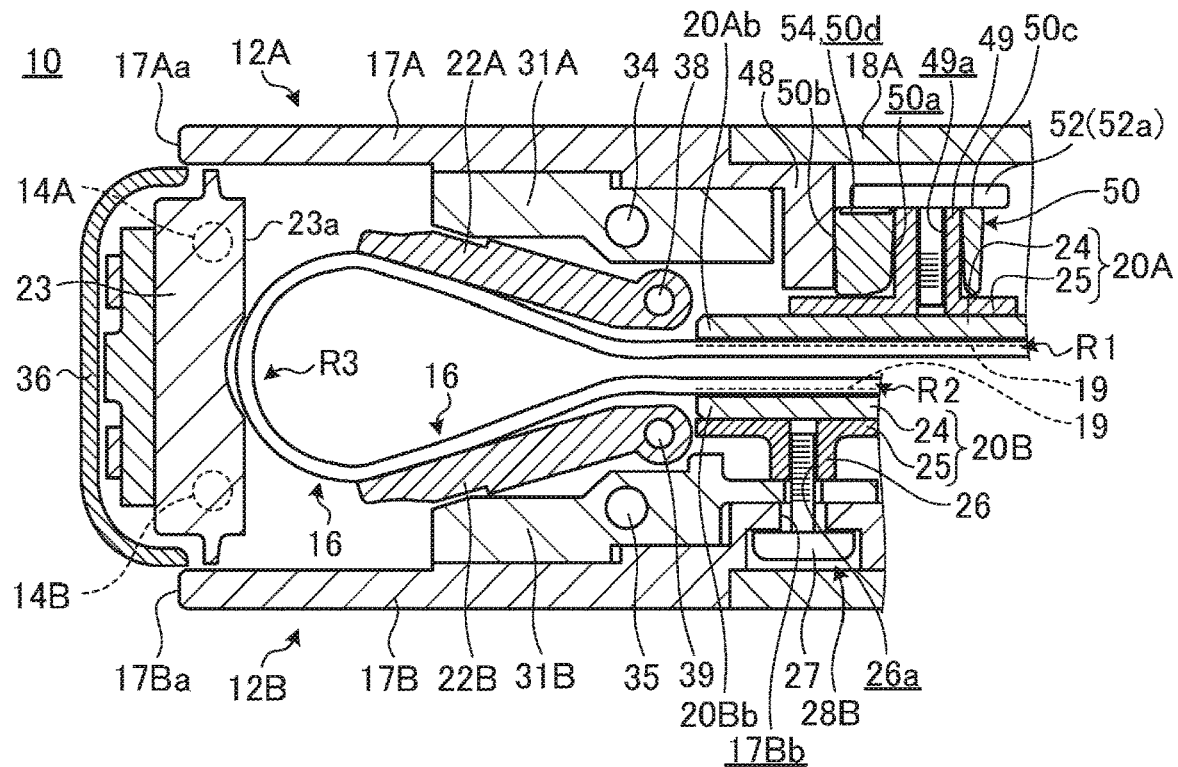
FIG. 6 is a schematic perspective cross-sectional view illustrating a state in which the electronic apparatus illustrated in FIG. 5 is in the 0-degree posture.

FIG. 4 is a bottom view schematically illustrating the internal structure of the electronic apparatus 10 illustrated in FIG. 3. FIG. 4 is a bottom view of the chassis 12A and 12B from which the cover members 18A and 18B are removed. FIG. 5 is a schematic cross-sectional view along line V-V in FIG. 4. FIG. 6 is a schematic perspective cross-sectional view illustrating a state in which the electronic apparatus 10 illustrated in FIG. 5 is in the 0-degree posture.

In the 0-degree posture illustrated in FIGS. 1 and 6, the chassis 12A and 12B are in a state of being folded in half. The display 16 is a flexible display of a sheet shape having flexibility, and is constituted of, for example, an organic EL. At the 0-degree posture, the display 16 is disposed such that a first region R1 on the side of the first chassis 12A faces a second region R2 on the side of the second chassis 12B, which are illustrated in FIG. 2, and a bending region R3, which is a boundary region between the regions R1 and R2, is in a state of being bent in an arc shape. In the 180-degree posture illustrated in FIGS. 2 and 5, the chassis 12A and 12B are disposed side by side with each other. At this time, the display 16 has the regions R1 and R2 and the bending region R3 disposed side by side on a XY plane, and forms a flat plate shape as a single sheet.

The display 16 has the first region R1 relatively fixed to the first chassis 12A and the second region R2 relatively fixed to the second chassis 12B. Specifically, a rear surface 16a of the first region R1 is fixed to the first chassis 12A via a first plate 20A, and the rear surface 16a of the second region R2 is fixed to the second chassis 12B via a second plate 20B. The bending region R3 of the display 16 is supported by a first support plate 22A, a hinge base 23, and a second support plate 22B that constitute the hinge device 14.

As illustrated in FIGS. 3 to 6, the plates 20A and 20B are disposed on the left and right with the hinge device 14 interposed therebetween, and support the rear surface 16a of the display 16 with respective front surfaces 20Aa and 20Ba. The rear surface 16a of the display 16 has the first region R1 fixed to the front surface 20Aa of the first plate 20A and the second region R2 fixed to the front surface 20Ba of the second plate 20B. The regions R1 and R2 are fixed to the plates 20A and 20B by using, for example, an adhesive material 19 such as double-sided tape (see FIG. 5).

The plates 20A and 20B of the present embodiment are configured by a base plate 24 and a metal frame 25. The base plate 24 is, for example, a carbon fiber reinforced resin plate in which carbon fibers are impregnated with a matrix resin such as epoxy resin. The metal frame 25 is formed of, for example, magnesium alloy or the like, and fixed to the outer peripheral edge portion of a rear surface 24a of the base plate 24. Since the plates 20A and 20B are carbon fiber reinforced resin plates, it is possible to secure high flatness and reduce thickness and weight. However, the carbon fiber reinforced resin plate has a concern that the carbon fibers may fall off from the outer peripheral end surface (edge) in powder shapes, and further, shape processing, screw processing, or the like is also difficult. Therefore, the plates 20A and 20B are fixed to the metal frame 25 with an adhesive or the like to surround the outer peripheral end surface of the base plate 24 and the outer edge portion of the rear surface 24a.

The first plate 20A is supported by the first chassis member 17A. The second plate 20B is supported by the second chassis member 17B. In the 180-degree posture illustrated in FIG. 5, the plates 20A and 20B are aligned in the X direction with a gap G between edge portions 20Ab and 20Bb facing each other. The bending region R3 of the display 16 is disposed to straddle the gap G, and the rear surface 16a of the display 16 is supported by the hinge device 14 disposed to fill the gap G.

The metal frame 25 of the first plate 20A is formed with a plurality of bosses 26. Each of the bosses 26 has, for example, a truncated cone shape, and is provided with a screw hole 26a having a female screw formed on the inner peripheral surface thereof. Each of the bosses 26 is provided to protrude from the rear surface 24a of the base plate 24, and is arranged along the outer peripheral edge portion of the first plate 20A. Although FIG. 5 illustrates only the specific structures of the boss 26 and the screw hole 26a on the side of the second plate 20B, the structures of the boss 26 and the screw hole 26a on the side of the first plate 20A may be the same as or similar to those.

The first chassis member 17A has substantially elliptical-shaped long holes 17Ab extending in the X direction at positions overlapping the respective screw holes 26a (see FIG. 4). Screws 27 are inserted through the respective long holes 17Ab and screwed into the respective screw holes 26a (see FIG. 7). As a result, the first plate 20A is fastened and fixed to the first chassis member 17A by using the screws 27. That is, the screw holes 26a, the long holes 17Ab, and the screws 27 constitute a first fastening portion 28A that fastens the first plate 20A to the first chassis member 17A.

Similarly, the metal frame 25 of the second plate 20B is also provided with the plurality of bosses 26 that form the screw holes 26a (see FIG. 5). However, the second chassis member 17B has perfect circle-shaped hole portions 17Bb at positions overlapping the respective screw holes 26a of the second plate 20B (see FIG. 4). The second plate 20 is fastened and fixed to the second chassis member 17B by the screws 27 screwed into the screw holes 26a through the respective hole portions 17Bb. That is, the screw hole 26a, the hole portion 17Bb, and the screw 27 constitute a second fastening portion 28B that fastens the second plate 20B to the second chassis member 17B.

The base plate 24 may be formed of a metal material or a resin material instead of the carbon fiber reinforced resin plate. In this case, the metal frame 25 may be omitted and the screw holes 26a may be provided in the base plate 24.

As illustrated in FIGS. 5 and 6, the bending region R3 of the display 16 is capable of relatively moving with respect to the chassis 12A and 12B. In the 180-degree posture, the rear surface 16a of the bending region R3 is supported by the hinge base 23 and the support plates 22A and 22B. In the 0-degree posture, the bending region R3 is bent in an arc shape, a part of the rear surface 16a is supported by the support plates 22A and 22B, and most parts of the rear surface 16a are separated from the hinge device 14.

As illustrated in FIGS. 3, 5 and 6, the hinge device 14 of the present embodiment has the hinge base 23, the first support plate 22A, and the second support plate 22B.

The hinge base 23 is provided at a position straddling the edge portions 17Aa and 17Ba of the chassis 12A and 12B, and extends over the substantially entire length in the Y direction along the edge portions 17Aa and 17Ba. The hinge base 23 is a block-shaped component formed of a metal material such as aluminum. The hinge base 23 supports two hinge shafts 14A and 14B aligned in the X direction in the 180-degree posture.

A first end portion of a first link arm 30A is rotatably supported around the first hinge shaft 14A. A first end portion of a second link arm 30B is rotatably supported around the second hinge shaft 14B. The link arms 30A and 30B have a boomerang-shaped curved shape that gradually approaches the inner surfaces 12Ab and 12Bb of the chassis 12A and 12B in a direction separating from the hinge shafts 14A and 14B.

A second end portion of the first link arm 30A is connected to a first bracket 31A by using a rotation shaft 34 to be relatively rotatable. The first bracket 31A is fastened to the first chassis member 17A by using the screws 27, together with the first plate 20A. A second end portion of the second link arm 30B is connected to a second bracket 31B by using a rotation shaft 35 to be relatively rotatable. The second bracket 31B is fastened to the second chassis member 17B by using the screws 27, together with the second plate 20B. Although FIG. 5 illustrates only the structure for fixing the second bracket 31B to the second chassis member 17B, the structure for fixing the first bracket 31A to the first chassis member 17A may be the same or similar except that the structure is bilaterally symmetrical thereto.

A plurality of link arms 30A and 30B and brackets 31A and 31B is aligned along a longitudinal direction (Y direction) of the hinge base 23 (see FIG. 3). As a result, the hinge base 23 connects the chassis 12A and 12B to be relatively rotatable. A gear mechanism for synchronizing the rotation operation between the chassis 12A and 12B, a torque mechanism for applying a predetermined rotational torque to the rotation operation between the chassis 12A and 12B, or the like are also provided inside the hinge base 23. A rear cover component 36 serving as a decorative cover is attached to an outer surface of the hinge base 23.

In the 180-degree posture illustrated in FIG. 5, the hinge base 23 supports the rear surface 16a of the bending region R3 of the display 16 with the front surface 23a of the hinge base 23. At this time, the hinge base 23 and the rear cover component 36 are accommodated in the chassis 12A and 12B, and disposed to straddle the edge portions 17Aa and 17Ba that are close to or abut each other in the X direction. In the 0-degree posture illustrated in FIG. 6, the hinge base 23 and the rear cover component 36 are disposed to close the gap between the inner surfaces of the edge portions 17Aa and 17Ba that are greatly separated apart, and become the rear cover of the electronic apparatus 10 that is folded like a book.

The support plates 22A and 22B are plates formed of a metal material such as aluminum, and have bilaterally symmetrical shapes. The support plates 22A and 22B are provided on the sides of the inner surfaces 12Ab and 12Bb of the chassis 12A and 12B, and extend over the substantially entire length in the Y direction along the edge portions 17Aa and 17Ba.

The first support plate 22A is disposed between the first plate 20A and the hinge base 23. The first support plate 22A has an edge portion on the side of the first plate 20A, which is connected to the first bracket 31A to be relatively rotatable via a rotation shaft 38. The first support plate 22A has an edge portion on the side of the hinge base 23, which is relatively movable with respect to the hinge base 23. The second support plate 22B is disposed between the second plate 20B and the hinge base 23. The second support plate 22B has an edge portion on the side of the second plate 20B, which is connected to the second bracket 31B to be relatively rotatable via a rotation shaft 39. The second support plate 22B has an edge portion on the side of the hinge base 23 to be relatively movable with respect to the hinge base 23.

The support plates 22A and 22B swing around the rotation shafts 38 and 39 as a rotation center in accordance with the rotation operation of the chassis 12A and 12B. In the 180-degree posture, the support plates 22A and 22B support the rear surface 16a of the bending region R3 of the display 16 by the front surfaces 22Aa and 22Ba of the support plates 22A and 22B. In the angular postures other than 180 degrees, the support plates 22A and 22B come into contact with the display 16 in a state in which a gap is provided between the support plates 22A and 22B and the display 16 or with a slight force that does not deform the display 16 (see FIG. 6).

As illustrated in FIG. 4, the first chassis 12A is equipped with, for example, a motherboard 40 on which a CPU is mounted, a sub battery device 41, and various electronic components. For example, a main battery device 42, a control board 43 of the display 16, a sub card 44, and various electronic components are mounted in the second chassis 12B. The sub card 44 is a board on which, for example, a power button, an external connector conforming to a USB standard, or the like is mounted.

In the electronic apparatus 10 configured as described above, the bending region R3 of the display 16 is not fixed to other members. For this reason, in the 180-degree posture illustrated in FIG. 5, the bending region R3 is in a state of being placed only on the front surfaces 22Aa, 22Ba, and 23a of the hinge device 14 at the gap G between the plates 20A and 20B. For this reason, there is a concern that the bending region R3 produces protruding wrinkles and waves, thereby deteriorating visibility and appearance quality.

Figure 7:
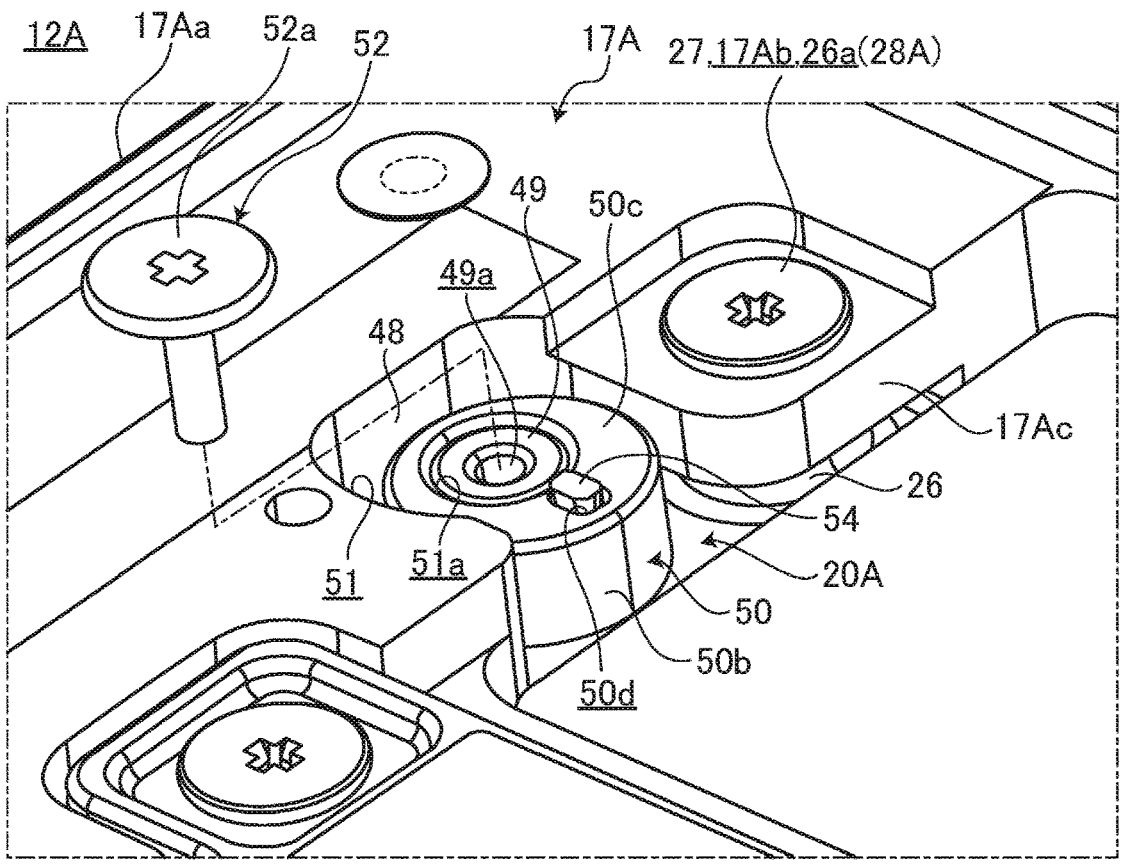
FIG. 7 is an enlarged perspective view of parts of a first chassis member and a first plate illustrated in FIG. 4.

Therefore, the electronic apparatus 10 of the present embodiment includes a configuration in which the bending region R3 is pulled in the width direction (X direction) at the time of manufacture, and the pulled state is maintained to suppress the occurrence of wrinkles and waves. FIG. 7 is an enlarged perspective view of parts of the first chassis member 17A and the first plate 20A illustrated in FIG. 4.

As illustrated in FIGS. 4 to 7, the electronic apparatus 10 includes a wall portion 48 provided in the first chassis member 17A, a protruding portion 49 provided in the first plate 20A, and a stopper member 50 interposed between the wall portion 48 and the protruding portion 49.

The wall portion 48 is a standing wall provided on the first chassis member 17A and stands upright in the Z direction facing the X1 direction. The wall portion 48 is provided below the edge portion 20Ab of the first plate 20A, that is, at a position close to the hinge device 14. Therefore, the wall portion 48 is positioned at a position that avoids the hinge device 14 in the X direction width of the first chassis member 17A and is closest to the side of the edge portion 17Aa.

The first chassis member 17A has a step 17Ac in the Z direction facing the X1 direction at a position slightly offset to the X2 side from the edge portion 17Aa (see FIGS. 4 and 7). The wall portion 48 of the present embodiment is configured as a part of the inner wall surface of a recess-shaped portion 51 in which the step 17Ac is formed to be recessed on the X2 side.

The protruding portion 49 is formed on the metal frame 25 of the first plate 20A. The protruding portion 49 is a boss-shaped portion that protrudes from the rear surface 24a of the base plate 24. The protruding portion 49 has a cylindrical shape and is provided with a screw hole 49a in which a female screw is formed on the inside. The protruding portion 49 is disposed on the X1 side of the wall portion 48 with a predetermined gap, and faces the wall portion 48.

The stopper member 50 is a rigid body interposed between the wall portion 48 and the protruding portion 49, and is, for example, a metal component such as stainless steel or aluminum.

The stopper member 50 is an eccentric cam that is fitted to the protruding portion 49 to be relatively rotatable around an axis.

The stopper member 50 has an eccentric shaft hole 50a and an outer peripheral surface 50b.

The protruding portion 49 is rotatably inserted into the shaft hole 50a. The inner peripheral surface of the shaft hole 50a and the outer peripheral surface of the protruding portion 49 are fitted into each other with an extremely small tolerance of, for example, about 0.05 mm, and there is almost no rattling. The outer peripheral surface 50b has, for example, a perfect circle shape, but the shaft hole 50a is at an eccentric position. For this reason, when the stopper member 50 rotates around the axis of the protruding portion 49, a distance between the axial center of the protruding portion 49 and the outer peripheral surface 50b changes, and contact and separation can be made with respect to the wall portion 48. The stopper member 50 may have the outer peripheral surface 50b with an elliptical shape, and in short, may have a configuration in which a diameter up to the outer peripheral surface 50b changes when rotating around the protruding portion 49 and contact and separation can be made to the wall portion 48.

The stopper member 50 is fastened to the protruding portion 49 by using a screw 52 screwed into the screw hole 49a in a state in which the protruding portion 49 is fitted into the shaft hole 50a to be relatively rotatable, and thus is fixed to the first plate 20A. That is, an end surface 50c of the stopper member 50 is at a position protruding in the Z direction further than the top surface of the protruding portion 49.

A friction member 54 may be interposed between the end surface 50c of the stopper member 50 and a head portion 52a of the screw 52 that are fastened to each other. The friction member 54 is a member to suppress the head portion 52a and the end surface 50c from slipping and spinning when the screw 52 is fastened, and to rotate the stopper member 50 at the same time as the screw 52. Examples of the friction member 54 can include a double-sided tape, a sponge, rubber, an adhesive, or the like. The friction member 54 is preferably disposed only on a part of the end surface 50c of the stopper member 50. More preferably, the shallow recessed portion 50d may be provided in a part of the end surface 50c, and the friction member 54 may be disposed in the recessed portion 50d.

Next, a method for manufacturing the electronic apparatus 10 will be described, particularly by exemplifying a method for assembling the display 16 to the chassis members 17A and 17B.

Figure 8A:
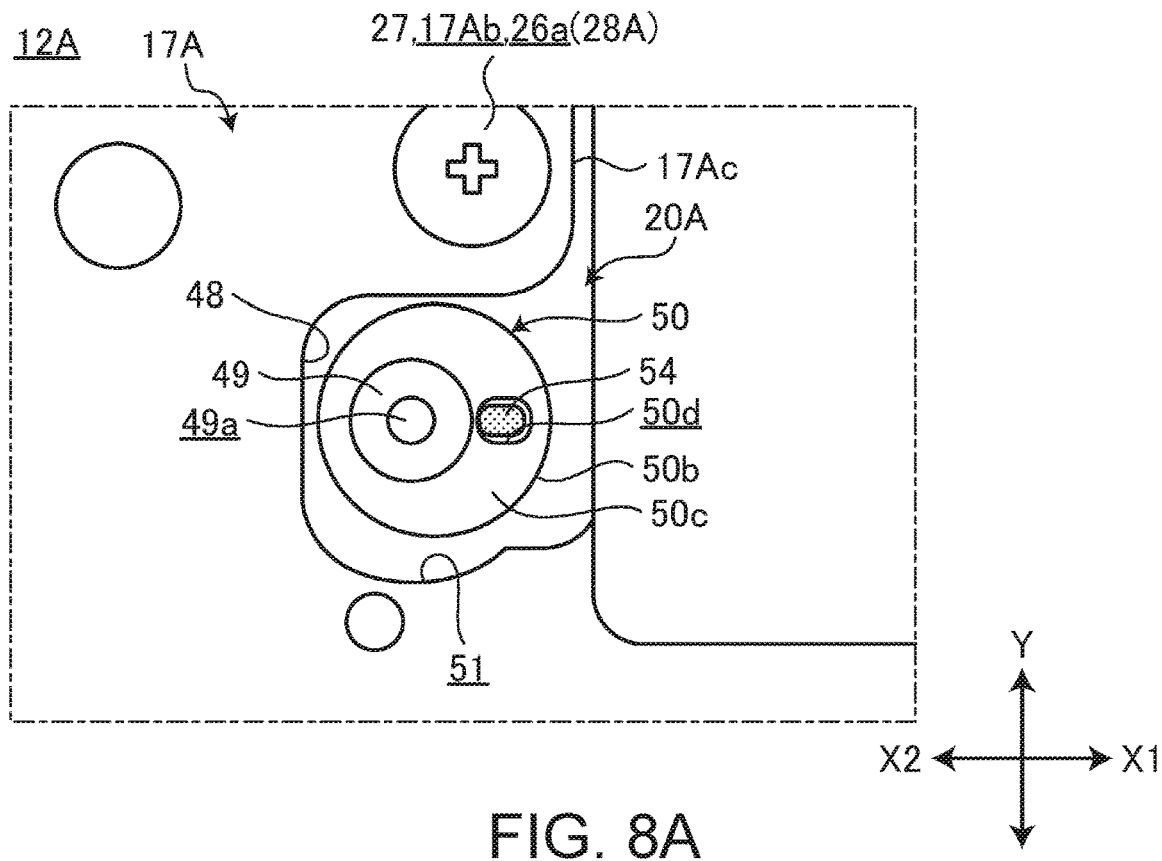
FIG. 8A is a schematic bottom view of a stopper member and a peripheral portion thereof.
Figure 8B:
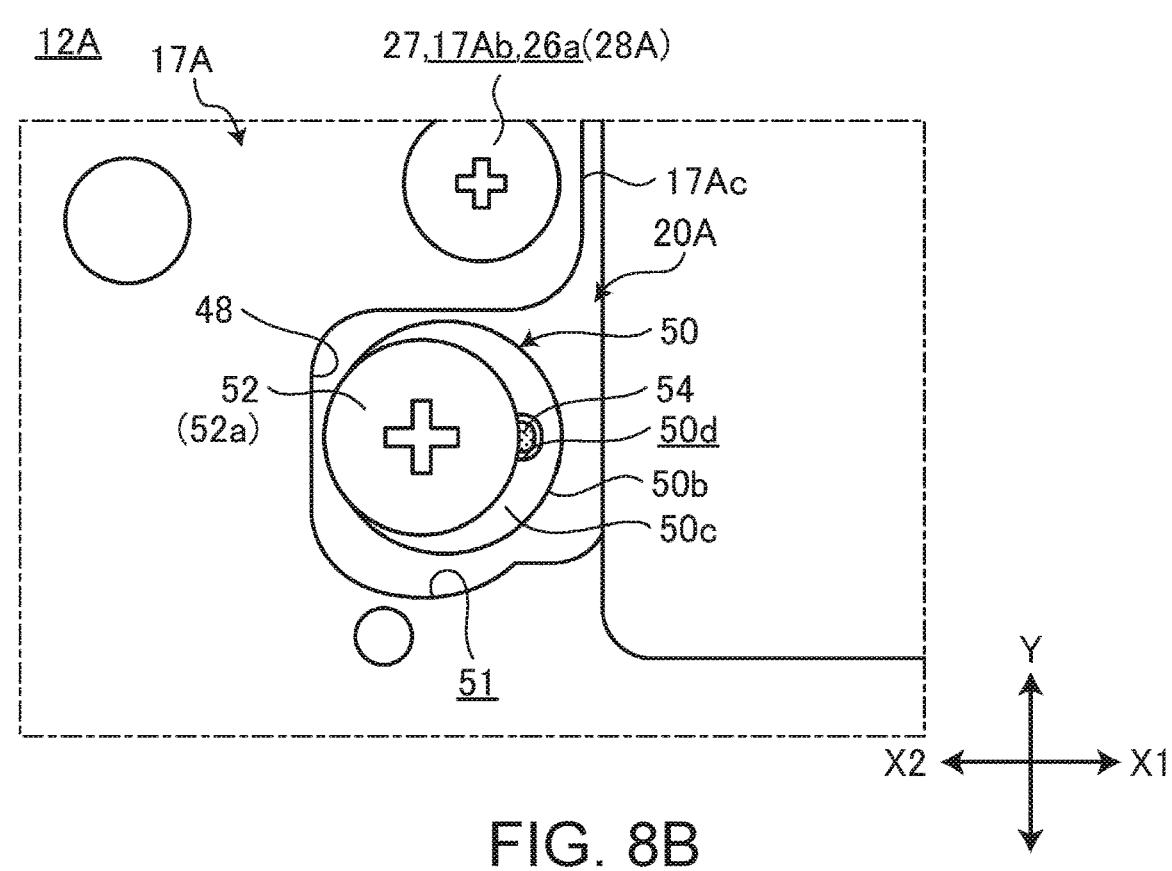
FIG. 8B is a view illustrating an operation of fastening the stopper member illustrated in FIG. 8A to a protruding portion by a screw.
Figure 8C:
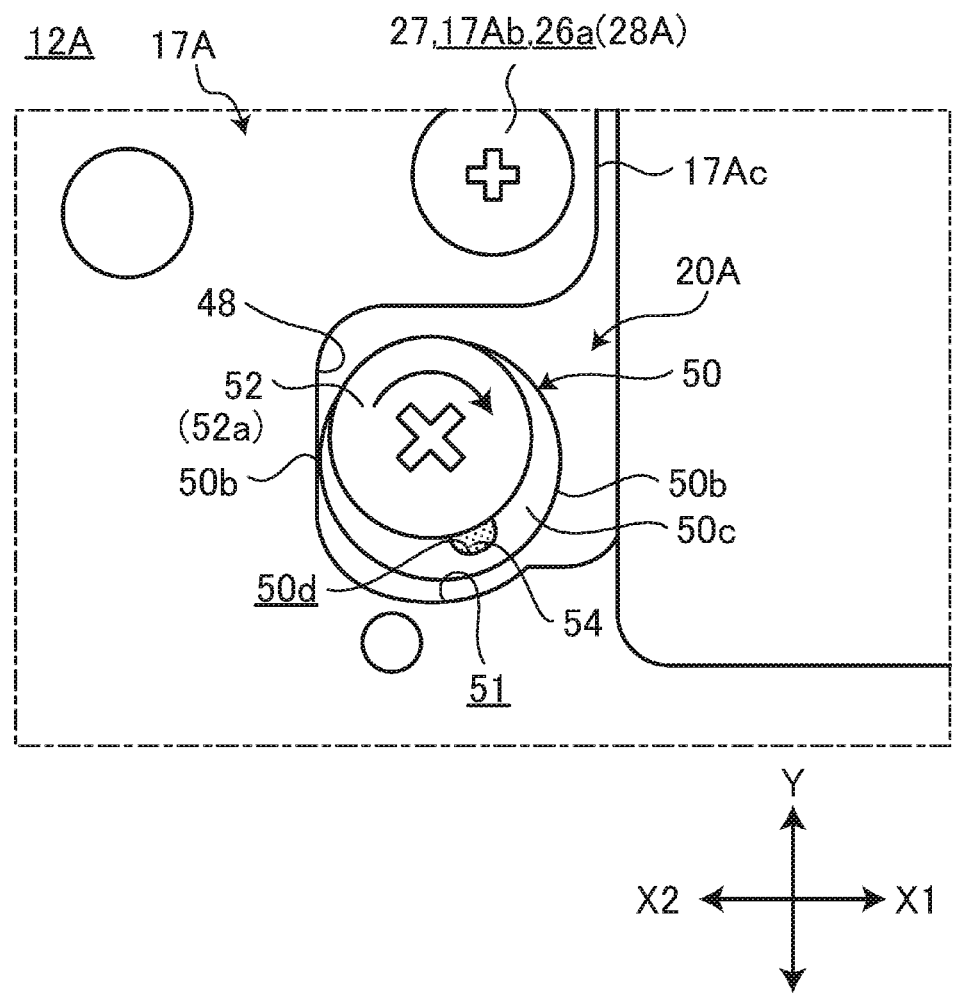
FIG. 8C is a view illustrating a state in which the screw is tightened from the state illustrated in FIG. 8B and the stopper member is interposed between the protruding portion and the wall portion.
Figure 9A:
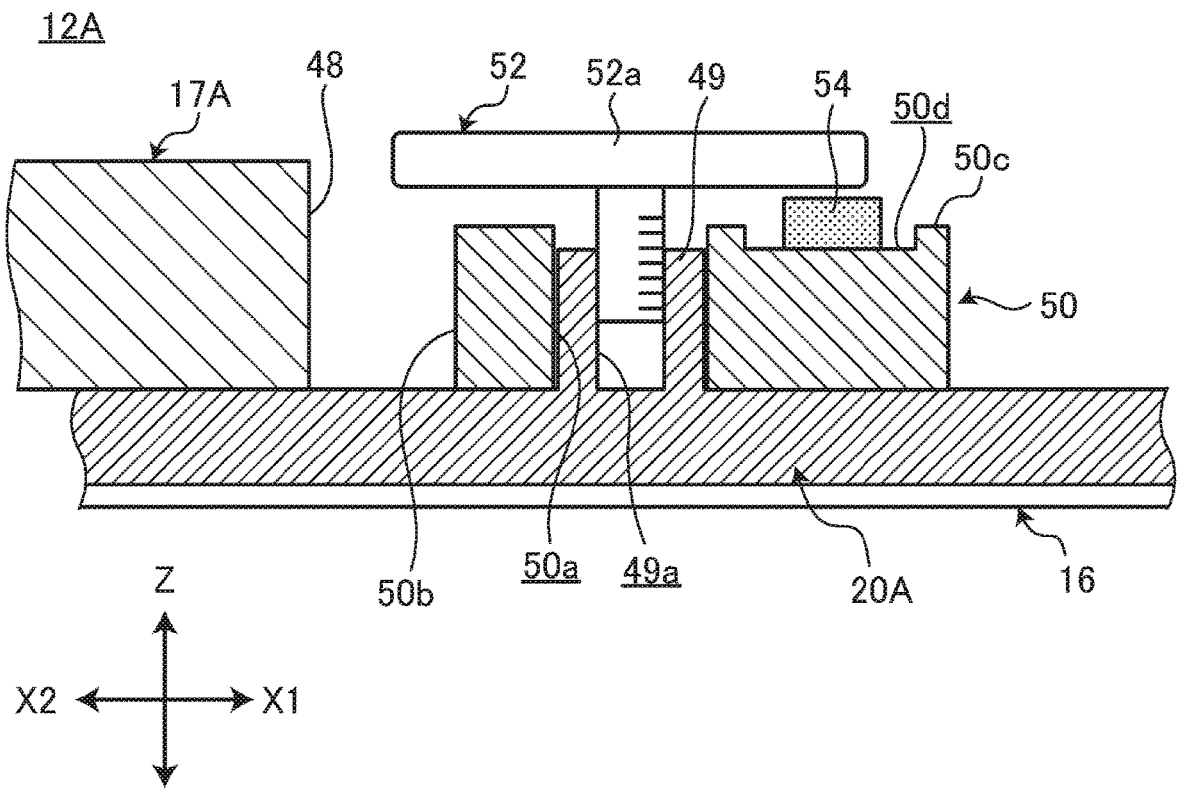
FIG. 9A is a schematic side cross-sectional view of the stopper member and the peripheral portion thereof.
Figure 9B:
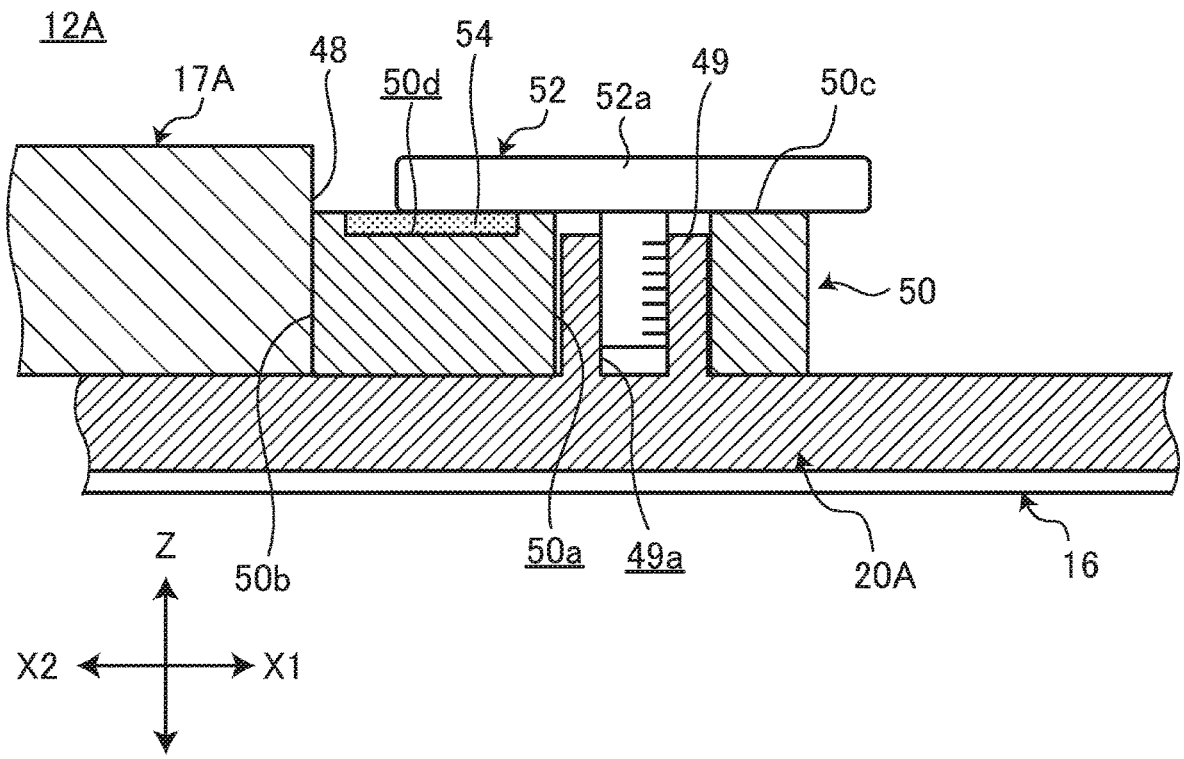
FIG. 9B is a view illustrating a state in which the screw is tightened from the state illustrated in FIG. 9A and the stopper member is interposed between the protruding portion and the wall portion.

FIG. 8A is a schematic bottom view of the stopper member 50 and the peripheral portion thereof. FIG. 8B is a view illustrating an operation of fastening the stopper member 50 illustrated in FIG. 8A to the protruding portion 49 by the screw 52. FIG. 8C is a view illustrating a state in which the screw 52 is tightened from the state illustrated in FIG. 8B and the stopper member 50 is interposed between the protruding portion 49 and the wall portion 48. FIG. 9A is a schematic side cross-sectional view of the stopper member 50 and the peripheral portion thereof. FIG. 9B is a view illustrating a state in which the screw 52 is tightened from the state illustrated in FIG. 9A and the stopper member 50 is interposed between the protruding portion 49 and the wall portion 48.

First, a display assembly is formed by fixing the regions R1 and R2 of the display 16 to the plates 20A and 20B with the adhesive material 19. At this time, the gap G is formed between the edge portions 20Ab and 20Bb of the plates 20A and 20B.

Next, such a display assembly is fixed to the chassis members 17A and 17B. The chassis members 17A and 17B are previously assembled with the hinge device 14 and connected to each other in a relatively rotatable state.

First, the second fastening portion 28B is fastened to fix the second plate 20B to the second chassis member 17B. The hole portion 17Bb of the second chassis member 17B has a perfect circle shape, and there is almost no rattling of the screw 27. For this reason, the second fastening portion 28B is capable of positioning and fixing the second plate 20B and the second chassis member 17B with good precision.

Subsequently, the first fastening portion 28A is fastened to fix the first plate 20A to the first chassis member 17A. At this time, the tension in the X direction is applied to the bending region R3 of the display 16 by pulling the first plate 20A toward the X1 direction separating from the second plate 20B. Then, while maintaining the state in which the tension is applied to the bending region R3 as described above, the first fastening portion 28A is fastened to fix the first plate 20A to the first chassis member 17A.

Here, the long hole 17Ab of the first chassis member 17A extends in the X direction. That is, the first fastening portion 28A is capable of fixing the first plate 20A and the first chassis member 17A with a predetermined adjustment width (for example, about 0.4 mm) in the X direction. For this reason, the first plate 20A can be fixed to the first chassis member 17A at a desired X-direction position in which the bending region R3 is pulled after the second plate 20B is fixed to the second chassis member 17B. As a result, the display 16 is relatively fixed to the chassis members 17A and 17B via the plates 20A and 20B, in a state in which the wrinkles and waviness in the bending region R3 are suppressed.

Finally, the stopper member 50 is fastened. First, as illustrated in FIGS. 8A and 9A, the protruding portion 49 is fitted into the shaft hole 50a of the stopper member 50. At this time, a state is assumed in which the end surface 50c provided with the friction member 54 faces the side of the screw 52, that is, a side opposite to the side of the first plate 20A.

Subsequently, as illustrated in FIGS. 8B and 9A, the screw 52 is screwed into the screw hole 49a of the protruding portion 49 and tightened. At this time, the friction member 54 is interposed between the head portion 52a of the screw 52 and the end surface 50c of the stopper member 50. The friction member 54 is disposed to protrude from the end surface 50c (see FIG. 9A). For this reason, when the screw 52 is tightened, the head portion 52a rotates the stopper member 50 at the same time via the friction member 54. That is, the stopper member 50 rotates with the screw 52. Then, while the stopper member 50, which is the eccentric cam, rotates together with the screw 52, the outer peripheral surface 50b eventually abuts the wall portion 48 (see FIGS. 8C and 9B).

The screw 52 is tightened to a predetermined fastening torque even after the outer peripheral surface 50b of the stopper member 50 abuts on the wall portion 48. Then, the stopper member 50 of which the outer peripheral surface 50b abuts against the wall portion 48 does not rotate any further, and the head portion 52a of the screw 52 tightens the stopper member 50 with respect to the protruding portion 49 while crushing the friction member 54. Finally, as illustrated in FIGS. 8C and 9B, the friction member 54 is crushed in the recessed portion 50d, the head portion 52a is brought into pressure contact with the end surface 50c, and the stopper member 50 is fastened and fixed to the protruding portion 49, that is, the first plate 20A. As a result, the stopper member 50 is interposed between the wall portion 48 and the protruding portion 49, and a state is reached in which the relative movement of the first plate 20A and the first chassis member 17A in the X direction is restricted.

As described above, the electronic apparatus 10 of the present embodiment includes the display 16 that is formed in a sheet shape having flexibility and has the first region R1 fixed to the front surface Aa of the first plate 20A, the second region R2 fixed to the front surface 20Ba of the second plate 20B, and the bending region R3 capable of being bent and provided to straddle the gap G between the plates 20A and 20B between the first region R1 and the second region R2, the first fastening portion 28A that fixes the first plate 20A to the first chassis member 17A, and the second fastening portion 28B that fixes the second plate 20B to the second chassis member 17B. Here, the first plate 20A has the protruding portion 49 protruding from the rear surface, and the first chassis member 17A has the wall portion 48 facing the protruding portion 49. Further, the electronic apparatus 10 includes stopper member 50 that is interposed between the protruding portion 49 and the wall portion 48 and restricts the relative movement of the first plate 20A with respect to the first chassis member 17A in the alignment direction of the first plate 20A and the second plate 20B.

Therefore, when the electronic apparatus 10 is in the 180-degree posture, the bending region R3 of the display 16 is stretched by applying the tension in the X direction, so that a state in which wrinkles and waves are suppressed can be maintained. That is, in a case where the configuration is such that the stopper member 50 is not provided, when the electronic apparatus 10 is subjected to an impact or the like, the first chassis member 17A and the first plate 20A are displaced at the first fastening portion 28A by the screw 27, and the bending region R3 may produce wrinkles and waves. In this respect, in the electronic apparatus 10, the stopper member 50 suppresses the displacement of the first chassis member 17A and the first plate 20A in the X direction, so that it is possible to suppress that the bending region R3 produces wrinkles and waves.

In particular, in the electronic apparatus 10, the first fastening portion 28A fixes between the first plate 20A and the first chassis member 17A with an adjustment width in the X direction corresponding to the length of the long hole 17Ab. On the other hand, the second fastening portion fixes between the second plate 20B and the second chassis member 17B with substantially no adjustment width in the X direction. For this reason, the second plate 20B can be positioned and fixed to the second chassis member 17B with high precision. On the other hand, the first plate 20A can be fastened to the first fastening portion 28A by adjusting a position in the X direction by the adjustment width of the long hole 17Ab, so that an appropriate tension can be applied to the bending region R3. On the other hand, in the first fastening portion 28A, due to such an adjustment width, there is a high possibility that the long hole 17Ab of the first chassis member 17A is displaced with respect to the screw 27 when receiving an impact or the like and the first plate 20A is moved to loosen the bending region R3.

In this respect, in the electronic apparatus 10, the stopper member 50 is installed between the first plate 20A and the first chassis member 17A that are fastened by the first fastening portion 28A, so that it is possible to suppress loosening of the bending region R3 due to the displacement of the first plate 20A. The first fastening portion 28A may be configured to use a perfectly circular hole portion instead of the long hole 17Ab. In this case as well, the first fastening portion 28A needs a certain degree of tolerance, and this is because there is a concern that the first plate 20A may be displaced by the amount of this tolerance.

The stopper member 50 is preferably an eccentric cam that is fitted to the protruding portion 49 to be relatively rotatable around an axis. Then, when the stopper member 50 is tightened to the protruding portion 49 by the screw 52, the stopper member 50 is rotated at the same time, and the outer peripheral surface 50b thereof can easily abut the wall portion 48. As a result, the stopper member 50 is capable of substantially steplessly responding to an interval of the gap between the protruding portion 49 and the wall portion 48, which changes depending on the tension applied to the display 16. In addition, work efficiency in assembling the stopper member 50 is also improved.

The electronic apparatus 10 preferably includes the friction member 54 between the end surface 50c of the stopper member 50 and the head portion of the screw 52. Then, the slip of the screw 52 and the stopper member 50 can be prevented, and the work efficiency of the assembly work of the stopper member 50 is further improved.

The friction member 54 is preferably disposed in the recessed portion 50d provided in a part of the end surface 50c of the stopper member 50. When the recessed portion 50d is provided in the end surface 50c, it is possible to prevent the friction member 54 from being sandwiched between the end surface 50c and the head portion 52a and functioning as a cushioning material when the stopper member 50 is completely fastened by the screw 52. As a result, in the screw 52, the head portion 52a reliably abuts the end surface 50c, and a strong fastening state can be obtained (see FIG. 9B). Further, after the screw 52 is fastened, the stopper member 50 functions as a sliding material on the contrary, and it is possible to prevent the screw 52 from being loosened.

As illustrated in FIGS. 3 and 4, a plurality of stopper members 50 is provided along the edge portion 20Ab of the first plate 20A. In the present embodiment, the stopper members 50 are provided near both ends of the edge portion 20Ab in the Y direction, and a total of the two stopper members 50 are provided. As a result, the first plate 20A can more reliably suppress the relative movement with respect to the first chassis member 17A by the plurality of stopper members 50 arranged in the Y direction, and can also prevent the first plate 20A from rotating on the XY plane.

Figure 10A:
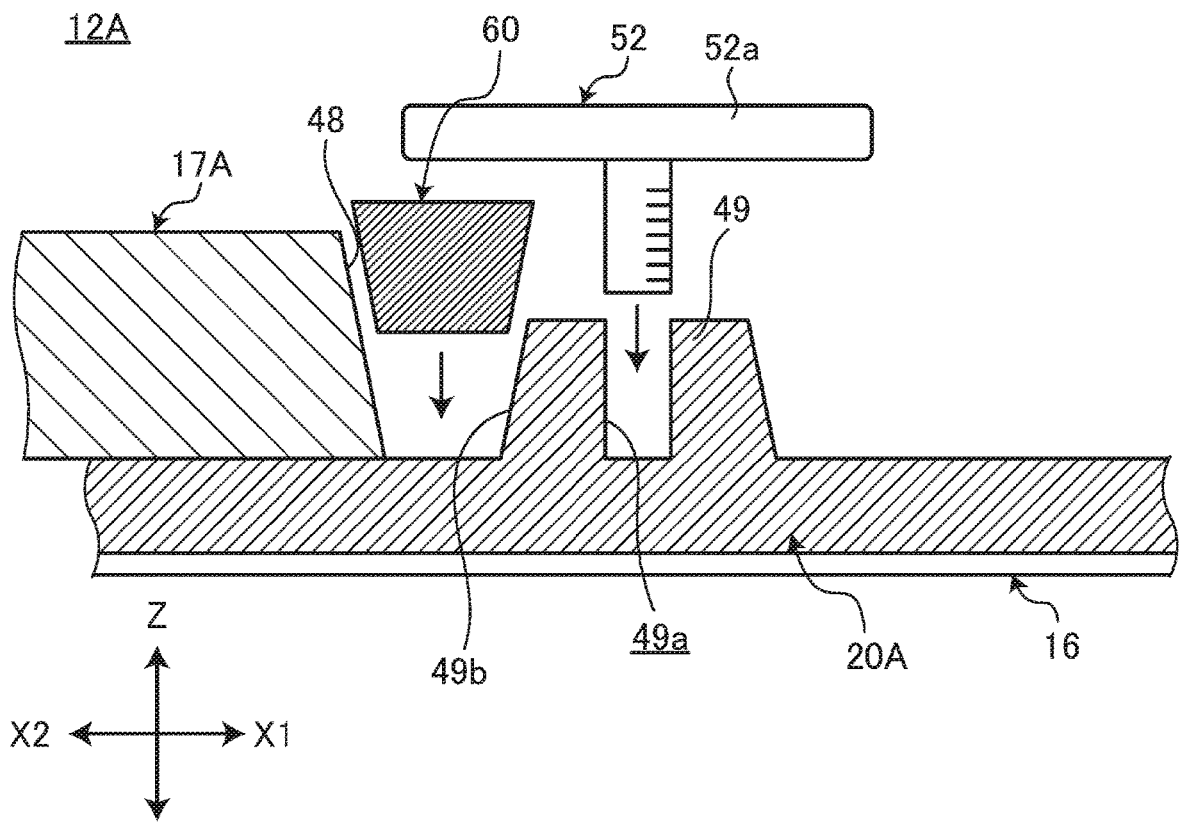
FIG. 10A is a schematic side cross-sectional view of a stopper member and a peripheral portion thereof according to a modification example.
Figure 10B:
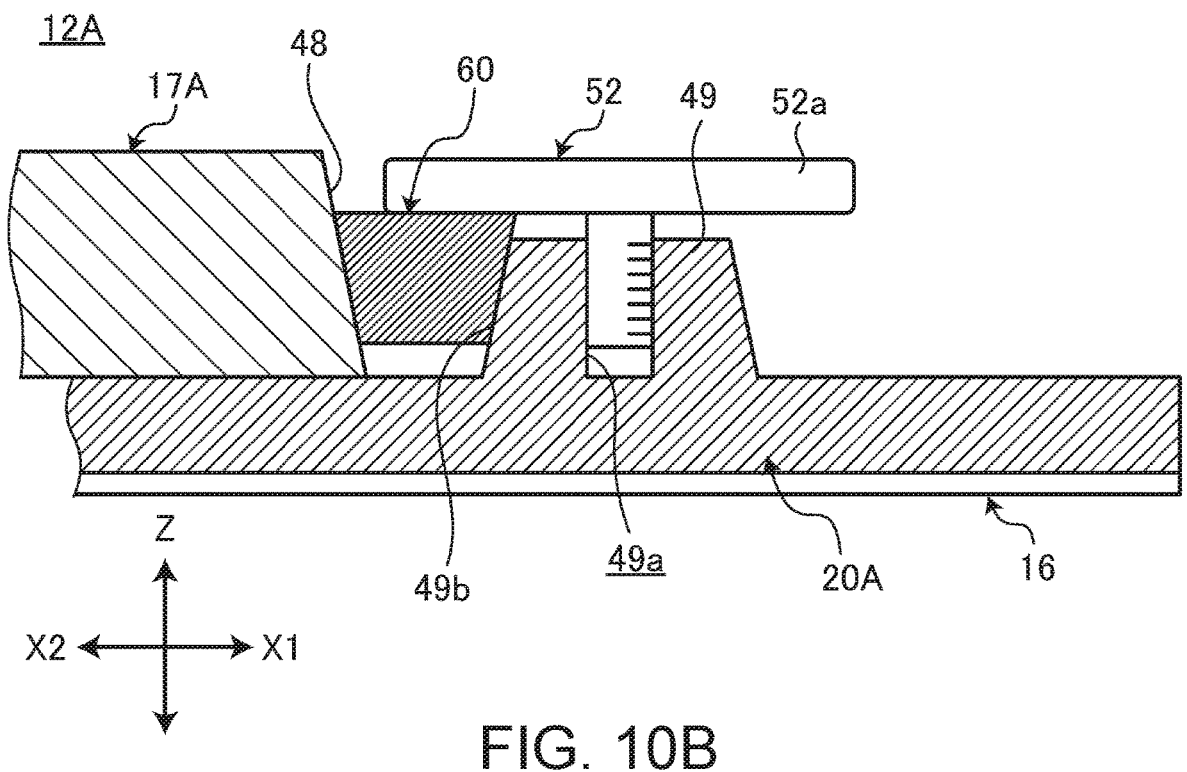
FIG. 10B is a view illustrating a state in which the screw is tightened from the state illustrated in FIG. 10A and the stopper member is interposed between the protruding portion and the wall portion.

The stopper member 50 may be other than the eccentric cam. FIG. 10A is a schematic side cross-sectional view of a stopper member 60 and a peripheral portion thereof according to a modification example. FIG. 10B is a view illustrating a state in which the screw 52 is tightened from the state illustrated in FIG. 10A and the stopper member 60 is interposed between the protruding portion 49 and the wall portion 48.

The stopper member 60 illustrated in FIGS. 10A and 10B is a wedge-shaped member formed in, for example, a substantially trapezoidal cross section and a substantially rectangular shape in plan view. In this configuration example, a tapered surface 49b, which is an inclined flat surface, is provided on the outer peripheral surface of the protruding portion 49, and a similar tapered surface is also provided on the wall portion 48. In the stopper member 60, when the screw 52 is tightened, the stopper member 60 gradually enters between the wall portion 48 and the protruding portion 49. Then, after the screw 52 is fastened, the stopper member 60 is also interposed between the wall portion 48 and the protruding portion 49 in the same manner as the stopper member 50 described above, and can restrict the relative movement of the first plate 20A in the X direction with respect to the first chassis member 17A and can suppress that the bending region R3 produces wrinkles and waves.

The present invention is not limited to the above-described embodiments, and modification is freely possible without departing from the gist of the present invention.

In the above, although the electronic apparatus 10 that is capable of being folded in half like a book is exemplified, the present invention can be applied to, in addition to a configuration of folding the same-shaped chassis in half, for example, various configurations, such as a double-door configuration in which small chassis are foldably connected to the left and right edge portions of a large chassis, respectively, an S-shaped folding configuration in which chassis with different folding directions are respectively connected to the left and right edge portions of one chassis, and a J-shaped folding configuration in which a small chassis is foldably connected to one of the left and right edge portions of a large chassis, and the number of chassis to be connected may be four or more.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 10 electronic apparatus
12A first chassis
12B second chassis
14 hinge device
16 display
17A first chassis member
17B second chassis member
20A first plate
20B second plate
28A first fastening portion
28B second fastening portion
48 wall portion
49 protruding portion
50, 60 stopper member
54 friction member

What is claimed is:

1. An electronic apparatus comprising:
a first chassis member;
a second chassis member that is adjacent to the first chassis member and relatively rotatably connected to the first chassis member;
a first plate that is supported by the first chassis member;
a second plate that is supported by the second chassis member and aligned with a gap between the first plate and the second plate;
a display that is formed in a sheet shape having flexibility, and has a first region fixed to a front surface of the first plate, a second region fixed to a front surface of the second plate, and a bending region capable of being bent and provided to straddle the gap between the first region and the second region;
a first fastening portion that fixes the first plate to the first chassis member; and
a second fastening portion that fixes the second plate to the second chassis member, wherein
the first plate has a protruding portion that protrudes from a rear surface,
the first chassis member has a wall portion that faces the protruding portion, and
a stopper member that is interposed between the protruding portion and the wall portion and restricts relative movement of the first plate with respect to the first chassis member in an alignment direction of the first plate and the second plate is further included.

2. The electronic apparatus according to claim 1, wherein
the protruding portion has a cylindrical shape in which a screw hole is provided on an inner side,
the stopper member is an eccentric cam that is fitted to be relatively rotatable around an axis with respect to the protruding portion, and
the eccentric cam is fastened to the protruding portion by using a screw screwed into the screw hole in a state where an outer peripheral surface abuts the wall portion.

3. The electronic apparatus according to claim 2, further comprising:
a friction member provided between an end surface of the eccentric cam and a head portion of the screw.

4. The electronic apparatus according to claim 3, wherein
the end surface of the eccentric cam partially has a recessed portion, and
the friction member is disposed in the recessed portion.

5. The electronic apparatus according to claim 1, wherein
the first fastening portion is capable of fixing relative positions of the first plate and the first chassis member with a predetermined adjustment width in the alignment direction, and
the second fastening portion fixes relative positions of the second plate and the second chassis member with substantially no adjustment width in the alignment direction.

6. The electronic apparatus according to claim 1, wherein
the protruding portion and the wall portion are disposed to be aligned along the alignment direction, and the wall portion is disposed further on a side of the second plate than the protruding portion.

7. A method for manufacturing an electronic apparatus including a first chassis member and a second chassis member that are relatively rotatably connected to each other, the method comprising:
a first step of fixing a first region of a display formed in a sheet shape having flexibility to a front surface of a first plate, fixing a second region to a front surface of a second plate aligned with a gap between the first plate and the second plate, and causing a state in which a bending region capable of being bent straddles the gap;
a second step of fixing the second plate to the second chassis member after the first step;
a third step of fixing the first plate to the first chassis member while pulling the first plate toward a separation direction separating from the second plate after the second step; and
a fourth step of interposing a stopper member between a protruding portion that protrudes from a rear surface of the first plate and a wall portion that is provided in the first chassis member and faces the protruding portion and restricting relative movement of the first plate with respect to the first chassis member in an alignment direction of the first plate and the second plate after the third step.

8. The method for manufacturing an electronic apparatus according to claim 7, wherein
the protruding portion has a cylindrical shape in which a screw hole is provided on an inner side,
the stopper member is an eccentric cam that is fitted to the protruding portion to be relatively rotatable around an axis, and
in the fourth step, while a screw is tightened to the screw hole and the eccentric cam is rotated, the eccentric cam is fastened to the protruding portion in a state where an outer peripheral surface of the eccentric cam abuts the wall portion.

* * * * *